(12) United States Patent
Rehkopf

(10) Patent No.: US 6,241,302 B1
(45) Date of Patent: Jun. 5, 2001

(54) AIR DEFLECTOR FOR MOTOR VEHICLES

(76) Inventor: John W. Rehkopf, 1050 Leith St., Maumee, OH (US) 43537

( * ) Notice: Subject to any disclaimer, the term of this patent is extended or adjusted under 35 U.S.C. 154(b) by 0 days.

(21) Appl. No.: 09/566,792

(22) Filed: May 7, 2000

(51) Int. Cl.[7] .......................................................... B60J 1/20
(52) U.S. Cl. ........................... 296/91; 296/152; 296/180.1
(58) Field of Search ............................ 296/91, 152, 180.1

(56) References Cited

U.S. PATENT DOCUMENTS

| | | | |
|---|---|---|---|
| 2,575,933 | * | 11/1951 | Thorne . |
| 2,714,036 | * | 7/1955 | Gentile . |
| 3,089,728 | * | 5/1963 | Shumaker . |
| 3,276,811 | * | 10/1966 | Schmidt . |
| 3,294,439 | * | 12/1966 | Phillips . |
| 3,330,454 | * | 7/1967 | Bott . |
| 4,309,053 | * | 1/1982 | Lett ....................................... 296/1 S |
| 4,339,145 | * | 7/1982 | Botts ...................................... 296/1 S |
| 5,094,497 | * | 3/1992 | Hartung et al. ........................ 296/91 |
| 5,292,166 | * | 3/1994 | Emery ................................... 296/91 |
| 5,382,070 | * | 1/1995 | Turner ................................ 296/180.1 |

* cited by examiner

Primary Examiner—D. Glenn Dayoan
Assistant Examiner—Mickki D. Murray

(57) ABSTRACT

The subject invention is an air deflector for a motor vehicle that is adapted to be attached to the posterior portion of a roof structure of a motor vehicle, with some limited overhang over the vertical rear vehicle surface for purposes of directing the flow of air over the roof of a moving motor vehicle downwardly over such rear surface of the motor vehicle, said deflector comprising an air deflector member forming with the motor vehicle an air passage that is curved downwardly from the upper rear surface of the roof in order to deflect air movements from a horizontal flow pattern over the roof surface to a substantial vertical flow directed downwardly and adjacent to the posterior surface of the vehicle, such air deflector device having a concave lower surface adapted to fit conformingly over the rear portion of the roof and the upper portion of the rear surface of the vehicle, with specialized attachment means affixed to such lower surface for attaching the air deflector to a portion of the motor vehicle without use of permanent attachment means to penetrate the body of the vehicle.

3 Claims, 6 Drawing Sheets

AIR DEFLECTOR FOR MOTOR VEHICLES

KNOWN PRIOR ART

The follow comprise patents that Applicant has found as relevant to the status of the prior art:
(A) U.S. Pat. No. 3,843,195
(B) U.S. Pat. No. 3,904,239
(C) U.S. Pat. No. 3,853,371
(D) U.S. Pat. No. 3,973,478
(E) U.S. Pat. No. 3,922,032

DISCUSSION OF PRIOR ART AND BACKGROUND OF INVENTION

The subject invention relates to devices and processes used to deflect the aerodynamic flow of air over the upper surface of a motor vehicle while the vehicle is moving. Such deflectors are variously and differentially structured to accomplish one or more functions. Some air deflectors are structured and deployed to deflect air away from vehicle surfaces that directly blunt the air flow, such as substantially flat, vertical surfaces facing towards the vehicle's usual direction of movement. Such air deflectors are primarily equipped and structured to reduce the resultant drag effect on the movement of the vehicle and thereby improve gas mileage.

Other air deflectors are appropriately structured and positioned on a motor vehicle to deflect the air flow over the roof of a vehicle to help yield downward force components to keep the rear portion of the vehicle stabilized relative to the wheel contact with the roadway.

Still other functions are accomplished by air deflectors, one of which is to direct the flow of air over the upper surface of the roof of a moving vehicle and thence downwardly over the posterior vertical surface of the vehicle. Such deflectors are structured and positioned towards the rear roof portion of the vehicle to utilize air flowing over roof surfaces and thence downwardly over the rear vehicle surface whereby the resultant redirected air flow cleanses dust, dirt, and other material accumulation that obscures the view through windows on such rear surface. The rear portion of the vehicle particularly the relatively vertical, flat surface of such vehicle and rear window areas, tend to collect dirt, dust and it is difficult to keep such surface clean for viewing and other purposes. The subject invention is conceived for this latter purpose as an improvement on devices adapted for this purpose.

There are several air deflector devices conceived and structured for this purpose in the existing art that are adapted to be retrofitted over the rear roof portion of a vehicle, particularly the van-type structure. Such devices are adapted to be affixed in some manner to the upper rear surface of the vehicle having downward turned means just aft of the most posterior roof portions structured to receive the rearward flow of air to deflect the air downwardly.

In this regard there are several disadvantages to existing air deflectors used for the above stated purpose. One such disadvantage is that such devices are not generally structured as a universal fit to conform to the various roof structures of the different types of vans. Another disadvantage is that the existing air deflection structures are structured with attachment means that invade and damage the integrity of the vehicle. More specifically, most such air deflectors are affixed through insert means that are adapted to penetrate the vehicle's metallic roof or outer surface, which in turn damages the vehicle. There are numerous other disadvantages in existing air deflectors used for this described purpose.

By reason of these shortcomings and disadvantages, in the above stated art, the subject invention is conceived as a means to improve such air deflector structures, and the subject invention is conceived accordingly, with the following objects.

OBJECTS OF INVENTION

It is an object of the subject invention to provide an improved air deflector for a motor vehicle;

Another object of the subject invention is to provide an improved air deflector for helping to cleanse the posterior areas of motor vehicles;

A further object of the subject invention is to provide an improved air deflector for a van-type motor vehicle; or other types of motor vehicles, irrespective of the size, shape, functions of the vehicle.

Still another object of the subject invention is to provide an improved structure appended to the roof of a motor vehicle for deflecting air flow to the rear surface areas of the vehicle;

Yet another object of the subject invention is to provide an improved structure that provides multiple purpose air deflection as a motor vehicle moves forward;

It is also a purpose of the subject invention to provide an air deflector that can be appended to detachable cab-type installations used on the upper rear portions of a motor vehicle;

An object of the subject invention is to provide improved attachment means for air deflectors or other devices to be appended to the outer surface of a motor vehicle.

A further object is to provide a more efficient and effective means for air flow cleansing of the posterior areas of a motor vehicle;

Other and further objects of the subject invention will be apparent from a reading of the description taken in conjunction with the claims.

DRAWINGS

In the drawings.

DESCRIPTION OF GENERAL EMBODIMENT AND SUMMARY OF INVENTION

Figure 1:
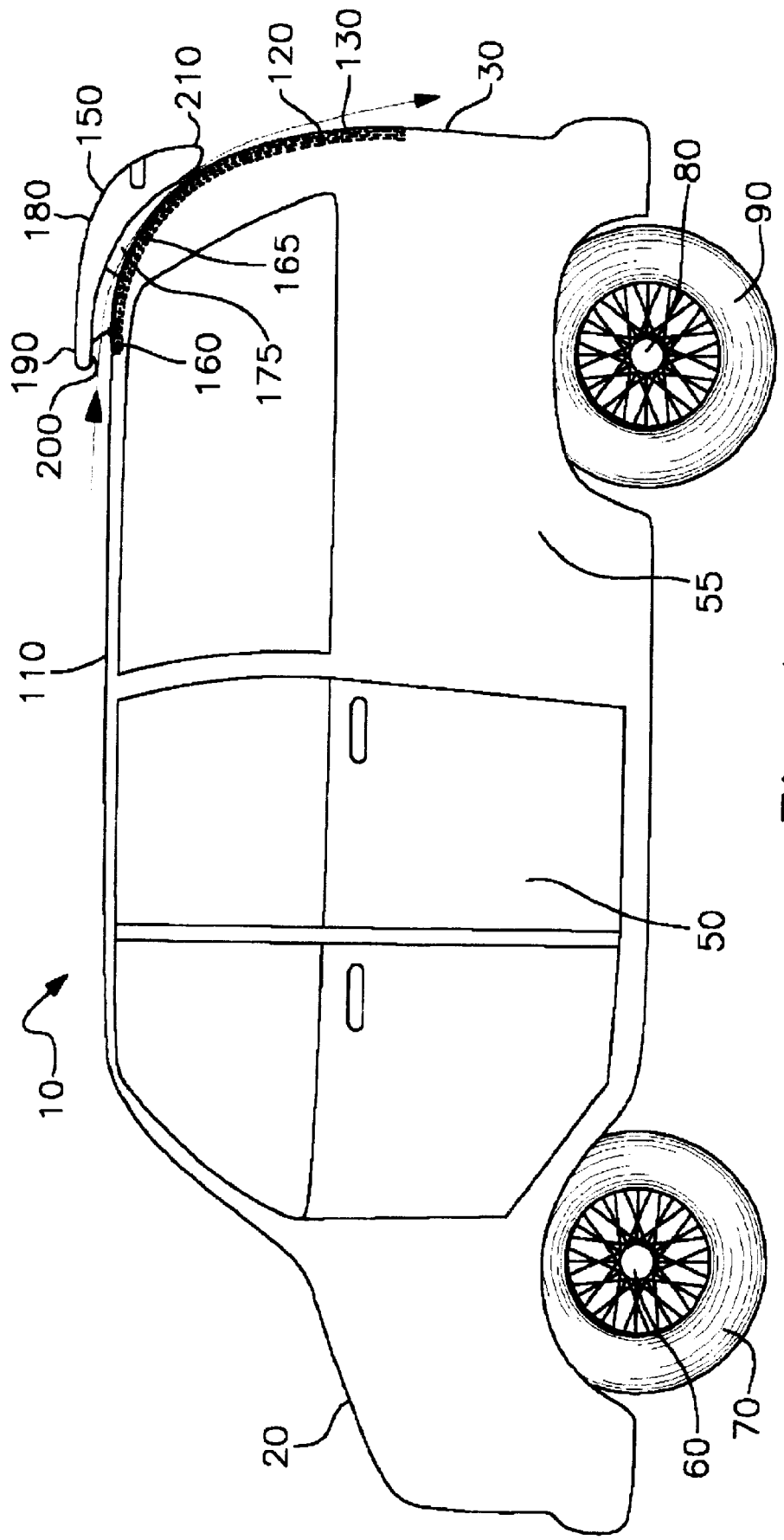
FIG. 1 is a side elevational view of the subject invention demonstrating how the subject apparatus is appended to a motor vehicle.

The subject invention is an air deflector for a motor vehicle that is adapted to be attached to the posterior portion of a roof structure of a motor vehicle with some limited overhang over the rear vehicle surface for purposes of directing the flow of air that accumulates over the roof of a moving motor vehicle so as to move such air downwardly over rear surface of the motor vehicle, said deflector comprising an air deflector member forming with the motor vehicle an internal air passage that is curved downwardly towards the rear vehicle surface from the upper rear surface of the roof in order to deflect air movements from a horizontal flow pattern over the roof surface to a substantially vertical flow directed downwardly and adjacent to the posterior surface of the vehicle, such air deflector device having a concave lower surface adapted to fit conformingly over the rear portion of the roof and adjacent upper portion of the rear surface of the vehicle, with specialized attachment means affixed to such lower surface for attaching the air deflector to a portion of the motor vehicle without use of permanent attachment means to penetrate the body of the vehicle.

In further summary, the subject invention is an air deflector that is structured to channel air flow over a moving vehicle from a horizontal flow pattern moving over the upper surface of the vehicle roof to a substantially vertical downward movement over the rear surface of the vehicle. The primary purpose of the downward air flow is to help cleanse the rear vehicle surface, including the vehicle rear windows, so as to maintain a clear window view through such rear window. Applicant's concept includes non-invasive means to attach such air deflector device to the motor vehicle By using such non-invasive attachment means no portion of the body of the motor vehicle is damaged by penetration of conventional or permanent fastener means, such as screws. Correspondingly, detachment of the air deflector when necessary can be quickly and efficiently accomplished, leaving virtually no marks or damage to the vehicle.

As described above, the subject invention is adapted to be used primarily on van-type vehicles or utility vehicles. However, the subject invention is equally applicable to all types of vehicles, and can also be affixed to removable cab structures that are appended to the rear upper portion of truck-type vehicles. The inventive concepts described herein are also applicable to other than over-the-road vehicles, and may apply to some instances to aircraft and boats.

DESCRIPTION OF PREFERRED EMBODIMENT

In describing the preferred embodiment of the subject invention, the following description is of only a few specific and preferred embodiments of the subject invention and as a consequence, the following description shall not be considered as limiting the scope of the subject invention as set forth in the claims appended hereto. Moreover, the fact that the preferred embodiments as are discussed as being used primarily for van types of vehicles, should not be considered as limiting the scope of the invention.

The structural concept of the subject invention centers on the use of the air flow over the roof of a moving motor vehicle to use such air flow to cleanse the rear surface portion of a motor vehicle, particularly the outer surface of the back panel of a van-type vehicle. Generally, the air deflector described herein directs such air flow to achieve an air-fluid circulation system directed downwardly over the outer surface of the back windows and back door panel of van-type or utility vehicle to keep such surface dust and dirt free. Moreover, the subject device is generally an air deflector apparatus designed and structured to be retrofitted to the roof of motor vehicles, and is further adapted to be easily affixed to the vehicle or removed without damage to the structural integrity of the vehicle. The air deflector apparatus herein comprises a longitudinally extending member that has a curved frontal under surface, as seen from a side elevational view; and such curved under-surface creates, when installed as stated below, a downwardly curved constricted air flow space between such under surface and the back corner portion of the motor vehicle so as to provide a means to continually air cleanse such surface while the vehicle is moving. In the preferred embodiment this constricted air flow space is open on the sides and is gradually reduced in size so as to funnel the resultant air flow into an increasingly confined area as the air flows backwardly and downwardly over the back surface of the motor vehicle. This latter feature causes the air flow to move at a more rapid speed and increased volume flow towards the end portions of the air flow space.

Figure 2:
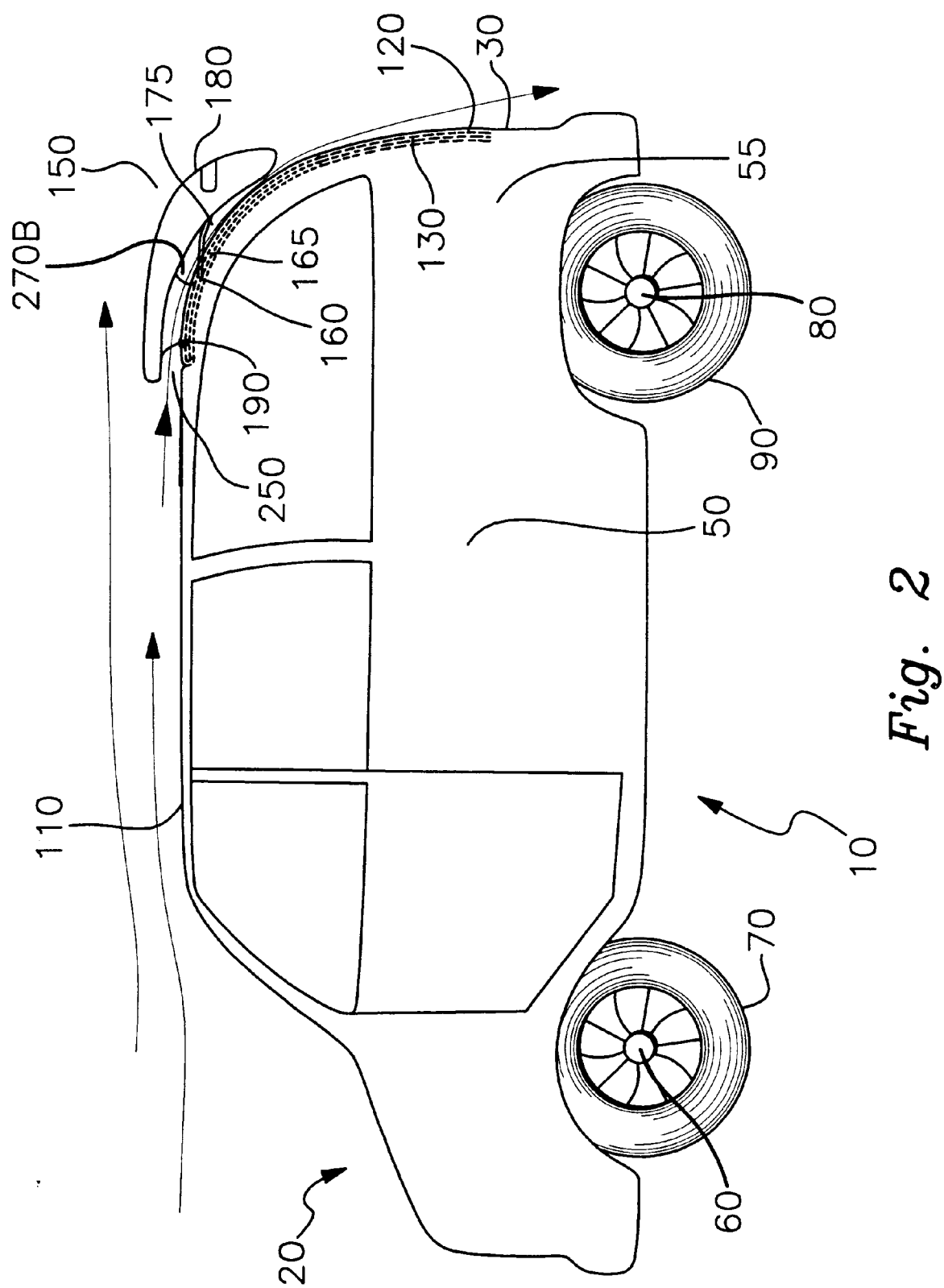
FIG. 2 is a side elevational view, in cross section, of the preferred embodiment of the subject air deflector showing means thereon to affix the air deflector to a motor vehicle.
Figure 3:
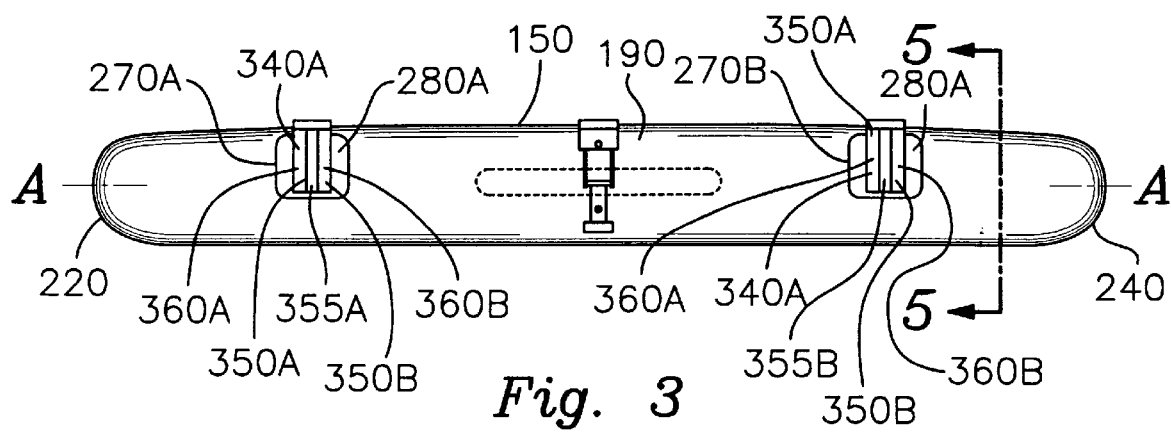
FIG. 3 is a rear elevational view of the preferred embodiment of the subject invention.

Specific attention is directed to the drawings in which a land-based motor vehicle 10 is shown. As seen in the drawings, particularly FIGS. 1 and 2, motor vehicle 10 as shown incorporates the features of the subject invention, and as can be observed, motor vehicle 10 shown in part has the general features of a conventionally structured and styled van-type motor vehicle having a front section 20 and a posterior section 30. Such motor vehicle may have any type of engine, not shown, so long as it is structured and adapted to be the primary motive power source for the motor vehicle 10. Moreover, it is to be noted that the precise type, structure and pertinent features of the motor vehicle 10 may be varied without affecting the applicability of the subject invention. In this latter regard, it is to be understood that the concepts of the invention herein are provided as an auxiliary structure for the motor vehicle 10. A comparison between the motor vehicle shown in FIGS. 1 and 2 reveals similar vehicles each with appended air deflectors 150. The respective air deflectors shown in FIGS. 1 and 2 have similar constructional attributes for purposes of the inventions described herein, but with one shown in FIG. 2 having a longer front to back extent. Otherwise, the attributes of each of the deflectors shown in FIGS. 1 and 2 are similar.

Moreover, motor vehicle 10 has a passenger section 50 disposed between the front section 20 and the rear section 30 of such motor vehicle. Rear section 30 of motor vehicle 10, as in most vehicles, houses seating areas as well as a storage area 55 Additionally, motor vehicle 10 has a front axle 60 on which are mounted rotatable wheels such as left front wheel 70 shown in FIGS. 1 and 2. Motor vehicle 10 also has a rear axle 80 on which rotatable wheels, such as left rear wheel 90. In some vehicles the front wheels are structured to be drive wheels while in others the rear wheels are adapted as the drive wheels. In others, both front and back wheels function as the drive wheels. However, the subject invention shall not be considered as being limited to a vehicle of the type specified above, and it is to be understood that the subject invention is equally applicable to other types of land-based vehicles of varying or differing structures.

Moreover, as seen in the drawings, vehicle 10 has a level upper roof surface 110 and a rear panel 120 which has an outer substantially vertical surface. As can be seen in the drawings, with particular attention being directed to FIGS. 1, 10 and 11, the rear panel 120 has a door member 130 disposed in the panel member. This door member 130 can be hinged either on a side edge or an upper edge 160, as seen in the drawings. The inventive concepts herein apply irrespective of whether the rear panel has a door therein or simply a window on the fixed or movable type. However, as to the vehicle 10 shown in the drawings, the door member 130 has a window 165 therein. This rear window member 165 shown in the drawings can be in some instances raised or lowered with such window having an upper edge 170 that is capable of moving up and down in the door frame. The significance of this latter aspect will be more fully discussed below.

The air deflector apparatus 150, which incorporates features of the subject invention, is adapted to be fitted over the upper surface 1 10 of vehicle roof 10 in a conforming manner so as to maximize the utilization of the dynamic air flow over such upper surface of the roof. Air deflector member 150 functions as stated to divert the flow of air over the moving roof vehicle to permit passage of such air down to the immediate area of the outer surface of the back panel 120 of the vehicle 10, as well as over rear window 165 structured in the door member 130 in such back panel. This flow of air is intended to be directed into the air flow passage 175 more fully described below.

Figure 11:
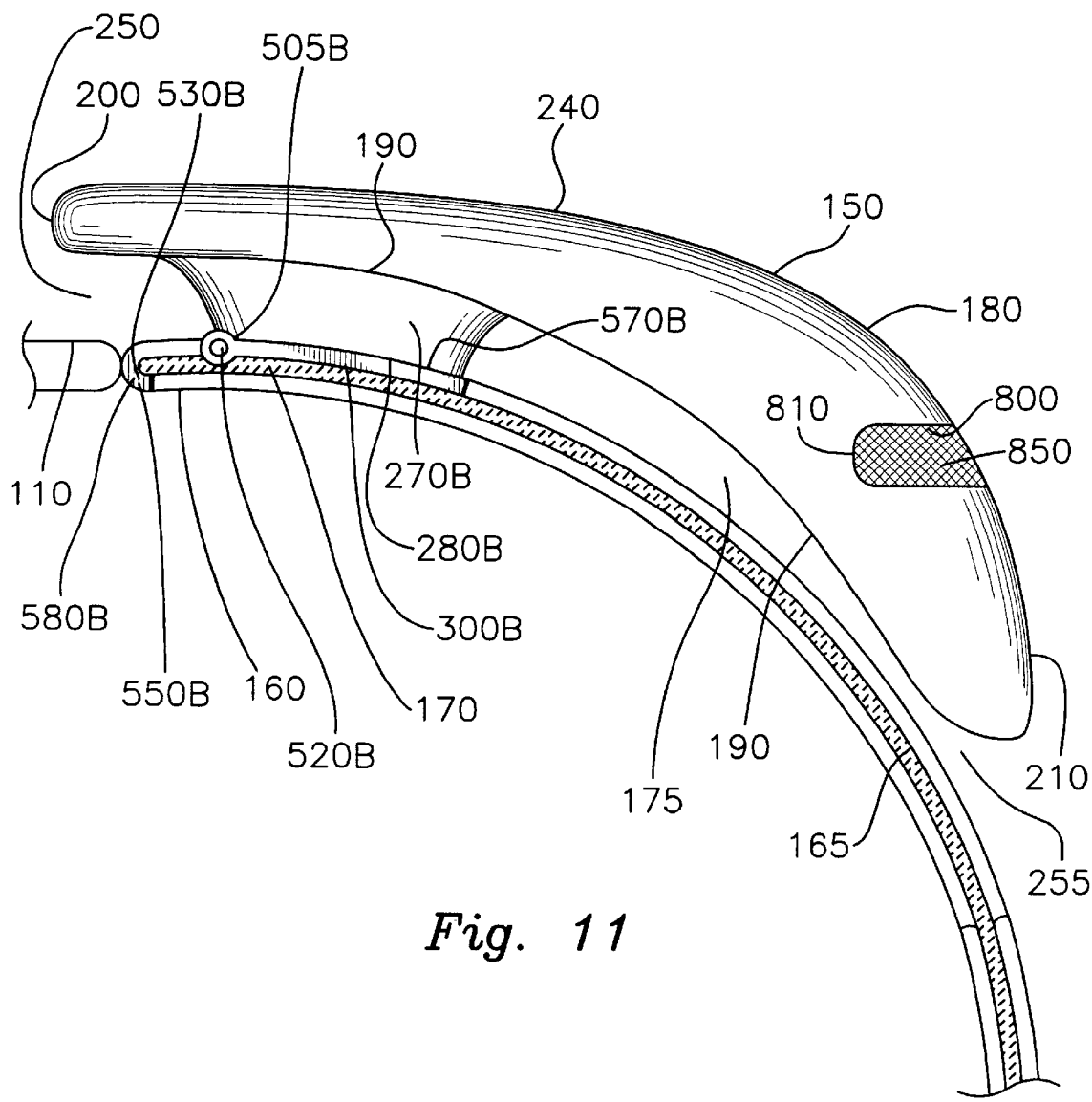
FIG. 11 is a side elevational view of the embodiment showing FIG. 5 demonstrating how the air deflector is attached.

In the preferred embodiment air deflector 150 is optimally affixed over the rear portion of the roof 110 of vehicle 10 in a position that is substantially adjacent to the upper edge of the rear panel door 130 as seen in FIGS. 1, 2 and 11. In the vehicle shown in the drawings, the rear panel door 130 is represented as the type that can be raised upwardly from hinge members at the top of the door. When the air deflector 150 is installed as seen in the drawings, particularly over the back of roof 110 and partially over the back panel 120, it forms a semi-closed constricted air flow space 175 between the air deflector and the adjacent outer vehicle surface over which the deflector is installed. This air flow space becomes gradually constricted as it extend rearwardly and downwardly and over the back panel 120 of the vehicle 10.

Figure 7:
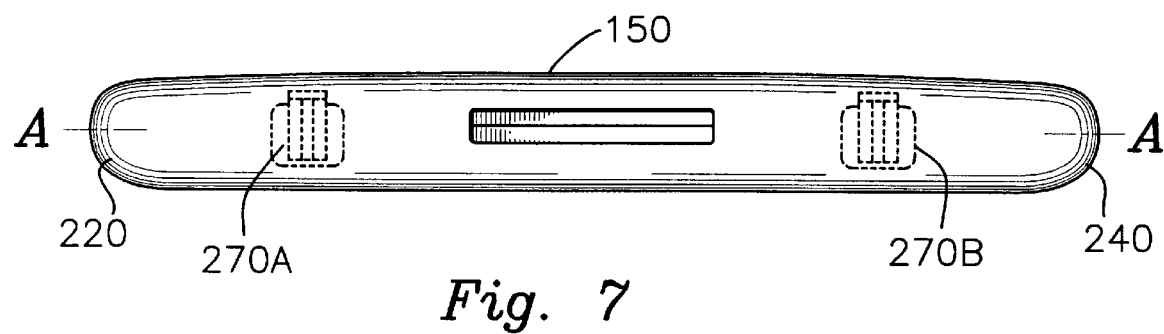
FIG. 7 is a side elevational view, in cross section, of the alternate embodiment of the subject invention shown in FIG. 5.

Referring again to the preferred embodiment of the subject invention, as seen in FIGS. 1, 2, 3, 4 and 5, the air deflector 150 is comprised preferably of plastic-based member and is an elongated member having a posterior upper outer surface 180 and a frontal lower frontal surface 190. The respective upper surface 180 and lower surface 190 or air deflector extend from a common front or leading edge 200 to a common posterior edge portion 210. Flanking the lateral portions of the upper surface 180 and lower surface 190 are side edges 220 and 240, with such upper surface 180 and lower surface 190 extending the entire length of the air deflector from side edge 220 to side edge 240. The longitudinal extent of the air delfector 150 from side edge 220 to side edge 240 has an longitudinal central axis A—A shown in the drawings. Moreover, in the preferred embodiment of the subject invention, as can be seen in FIG. 7, the lower surface 190 of the air deflector 150 is curved in a concave manner as viewed from the bottom or side thereof so that such lower surface 190 can be conformingly placed and positioned in a spaced away portion, over the downwardly curved rear corner portion of the vehicle at the extreme posterior part of roof 110, as seen in FIGS. 1, 2, 10 and 11. More particularly, as seen in FIGS. 1, 2, 7, 10, and 11, the lower surface 190 of air deflector 150 is slightly curved in a concave, manner while the upper surface 180 of the air deflector is generally convex in configuration as it extends from the front edge 200 rearwardly. The concave curvature of the lower surface 190 decreases at the portion thereof nearest to posterior edge 210, so that the lower surface becomes substantially vertically disposed in a downward direction when affixed on the rear of vehicle 10 and by this disposition extends in a direction somewhat parallel to the rear panel 120 of vehicle 10. This feature is seen in FIGS. 1, 2, 10 and 11.

Alternatively stated, air deflector 150 has a curved lower surface 190 which can be conformingly positioned with some minimal spatial separation from the upper surface of vehicle roof 110 as well as having some minimal spatial separation from the upper portion of the back panel 120 of vehicle 10. By virtue of the concave curvature formed into the lower surface 190 and the positioning of the air deflector over part of the back roof structures, as well as over the upper portion of the rear panel 120, an air flow space 175 is formed between the lower surface 190 of air deflector 150 and the adjacent vehicle roof and panel surfaces. This constricted air flow space has an entrance point 250 just under the leading edge 200 of air deflector 150, as installed, just above the adjacent upper roof surface 110. This air flow space 175 thusly formed extends as seen in the drawings over the rear of roof 110 and immediately downward over the rear vehicle panel 120. As stated, this air flow space is open near the side edges 220 and 240 of the air deflector 150. The directional arrows shown in FIGS. 1, 2, 10 and 11 graphically demonstrate the air flow through this passageway, which as stated above in the preferred embodiment becomes increasingly smaller in distance between such lower surface and the roof and back panel surface as it extends from the air entrance point 250 to an exit point 255 adjacent the outer surface of the back panel 120.

Figure 4:
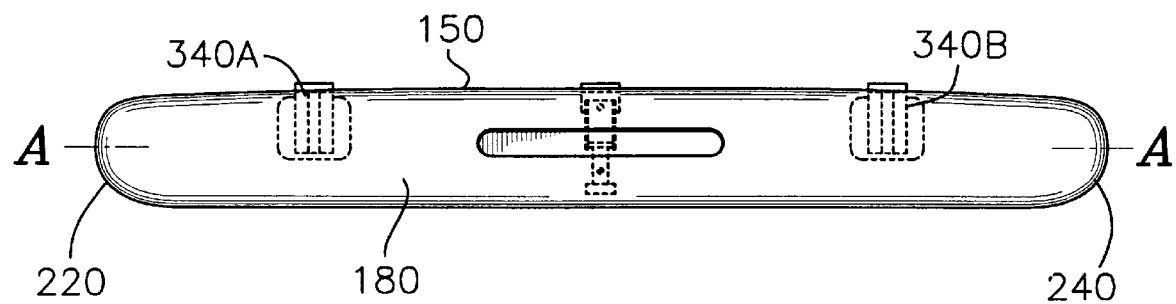
FIG. 4 is a side elevational view; in cross section, of the preferred embodiment of the subject invention.

In the embodiments shown in the drawings, the lower surface 190 of the air deflector has two downwardly and outwardly protruding support members 270A and 270B. These protruding members 270A and 270B are spatially separated members that are preferably equally spaced in some symmetrical manner from the corresponding side edges 220 and 240 of air deflector 150. The protruding members 270A and 270B each have a frontal surface 275A and 275B which is either flat or slightly rounded and a lower face 280A and 280B which is slightly rounded in a concave manner, but which can be flat. As seen in the cross-sectional side elevational configuration shown in FIG. 7, the frontal surface 275A and 275B and the mating lower surfaces 280A and 280B respectively are substantially perpendicular to one another with each lower surface blending into the lower surface 190 of the air deflector 150 as shown in FIGS. 4 and 7. In this latter respect it is noted that the frontal face 275A and 275B on each protruding member may be relatively flat while the lower face 280A and 280B may be formed so as to not to blend in and lead into the lower surface 190 of the air deflector in an uninterrupted manner. In a primary embodiment of the subject invention, as seen in FIGS. 1, 2, 4, 7 and 11, the lower face 280A and 280B of each of the protruding members 270A and 270B has a plate member 340A and 340B affixed thereon such plate member being affixed conformingly and flush against each lower face 280A and 280B. The plate members 340A and 340B may be metallic or other material and are integrally affixed to such lower face of each protruding member 270A and 270B. As seen in FIGS. 3, 4, 5 and 6 in the preferred embodiment of the subject invention, the plate member 340A and 340B is formed with two longitudinally extending parallel strips, 350A and 350B preferably of metallic or a plastic based composition; however, other materials may be used in this regard, The metallic strips 350A and 350B extend in a longitudinal direction that is perpendicular to the longitudinal axis A—A of the air deflector 150. Further, as seen in the drawings, the parallel metallic strips 350A and 350B are spaced from one another a minimal distance, this particular spacing being intended to form a longitudinal spatial area 355A and 355B between such metallic strips to accommodate an electrical wire as more fully explained below. The outer surface of each metallic strip 350A and 350B is adapted to receive a corresponding shaped and sized longitudinal strip of double sided adhesive tape 360A and 360B. The tape affixed to the metal strips 350A and 350B is adapted to be adhered to the outer surface of the motor vehicle as a means of attaching the air deflector without damage to the vehicle, as more fully described below.

It is to be stressed at this point that the plate members 340A and 340B may be structured in another manner than that described above, and may be formed with a solid metal plate, without the parallel metallic strips described. Alternatively, the plate members may be formed as a continuous member or as a discontinuous member with or without intermittent spacing between its components. Moreover, the manner of adhering the plate members 340A and 340B may employ other than adhesive means to accomplish the noninvasive attachment of the air deflector 150 to the motor vehicle. In some embodiments an intermediate plate is positioned between the lower face 280A and 280B of the respective protruding members to hold the respective plate members 340A and 340B.

As stated, in order to affix the air deflector 150, to the outer surface of the motor vehicle 10, the lower surface of each of the protruding members 270A and 270B as indirectly or directly covered with adhesive coating or strips of adhesive tape 360A and 360B, which adhesive substance will adhere indirectly the lower face 280A and 280B of the vehicle and is easily detached when the air deflector 150 is to be romoved from the vehicle for any purpose. This adhesive arrangement avoids invading the body of the vehicle 10 with screws, bolts, or the like for attaching the air deflector to the vehicle without damage to the vehicle. In some embodiments each adhesive strip 360A and 360B has an outer peel off cover to be removed when the air deflector is to be installed.

In yet another embodiment of the subject invention, the respective lower faces of 280A and 280B of the protruding members 270A and 270B can be structured without an intermediate or other plate member affixed thereto, and adhesive or other material can be placed directly on such lower faces. Other structural formations can be used for the protruding members 270A and 270B so long as the protruding members function when directly or indirectly affixed to the outer surface of vehicle 10, to hold the air deflector 150, and specifically the lower surface 190 thereof in a spaced relationship away from the outer surface of the motor vehicle 10 so as to provide the air flow passage 175 between such surface of the air deflector and the adjacent surface portion of the motor vehicle 10. This latter feature is shown in FIGS. 1, 2, 7 10. Moreover, only one protruding member may be deployed on the undersurface 190 of the air deflector 150 for purposes of implementation of the subject invention, or alternatively more than two protruding members may be used on such undersurface in order to achieve the objects of the subject invention.

Figure 8:
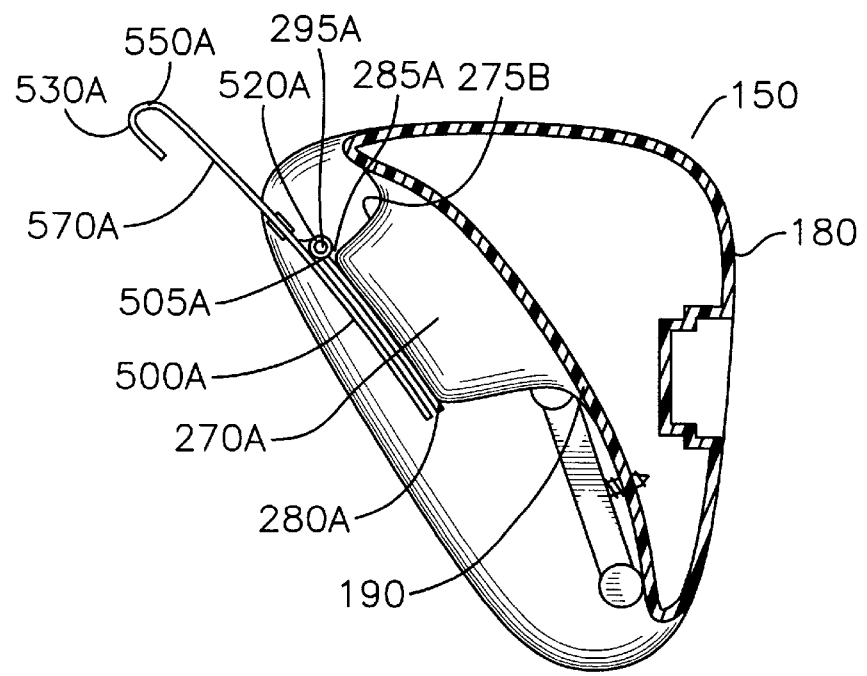
FIG. 8 is a frontal elevation view of a third embodiment of the subject invention.
Figure 9:
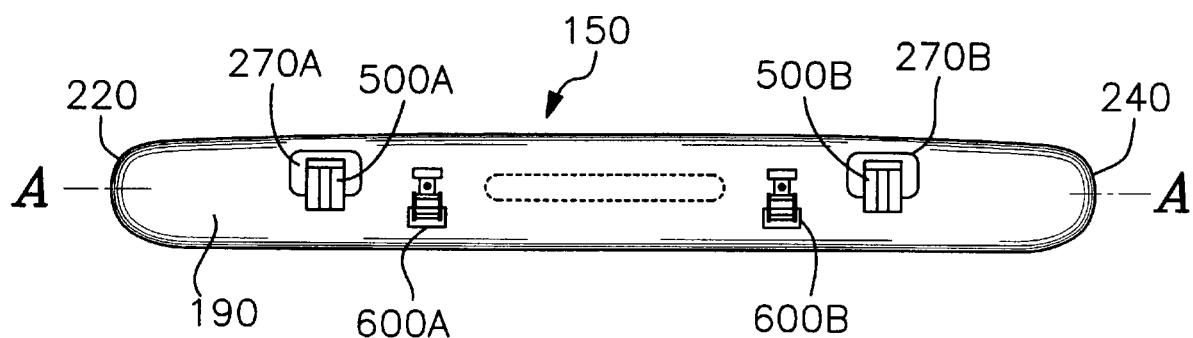
FIG. 9 is a side elevational view, in cross section, showing the locking mechanisms of the embodiment shown in FIG. 8 as well as those embodiments shown in FIGS. 1–4.

As stated alternatively, as can be observed from the drawings, integrally formed on the lower surface 190 of the air deflector 150 are two separate protruding members 270A and 270B, such protruding members being spaced apart on the lower surface 190 of the air deflector 150. More specifically, these protruding members 270A and 2708 are spaced apart from one another by an arbitrary distance and are formed as being approximately shaped, as rectangular members as seen from a frontal view seen in FIGS. 3, 4, 5 and 6, while the side cross sectional view of each of the protruding members is shown as being substantially rectangular as seen in FIGS. 1, 2, 7 10, 11. In some embodiments, the protruding members 270A and 270B may be shown as triangular in shape,from a side elevational view, as seen in FIG. 8, with the lower surface 280A and 280B of each protruding member leading and blending in with the lower surface 190 of the air deflector 150, without interruption. Other shapes for the protruding members 270A and 270B may be used in this regard.

Figure 5:
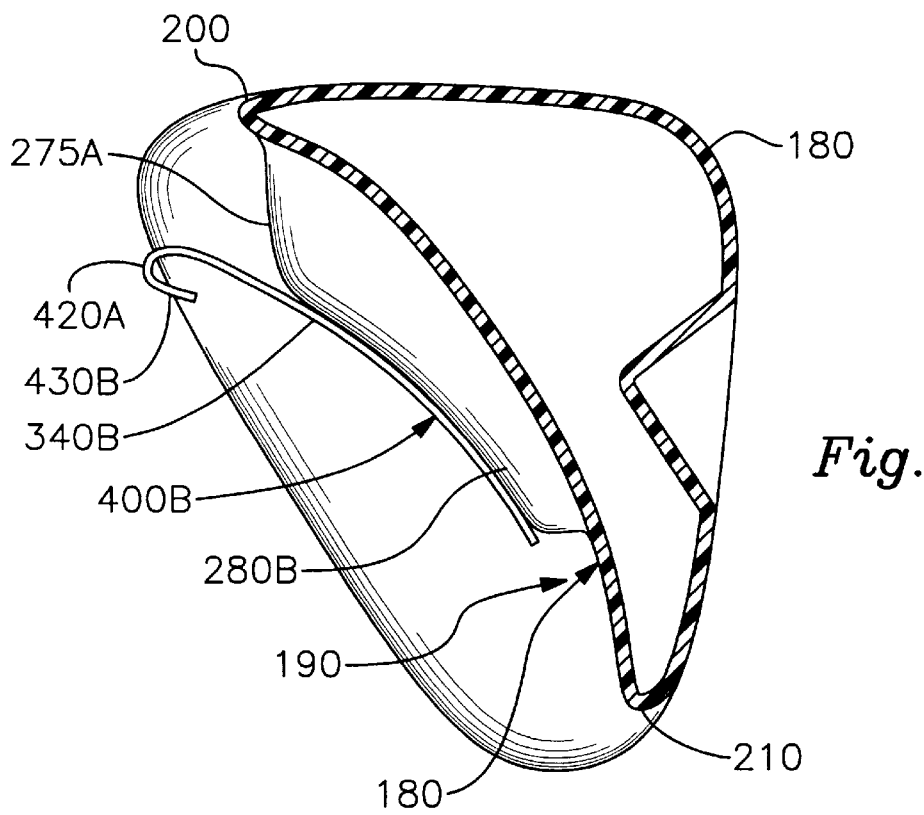
FIG. 5 is a front elevational view of an alternate embodiment of the subject invention.
Figure 6:
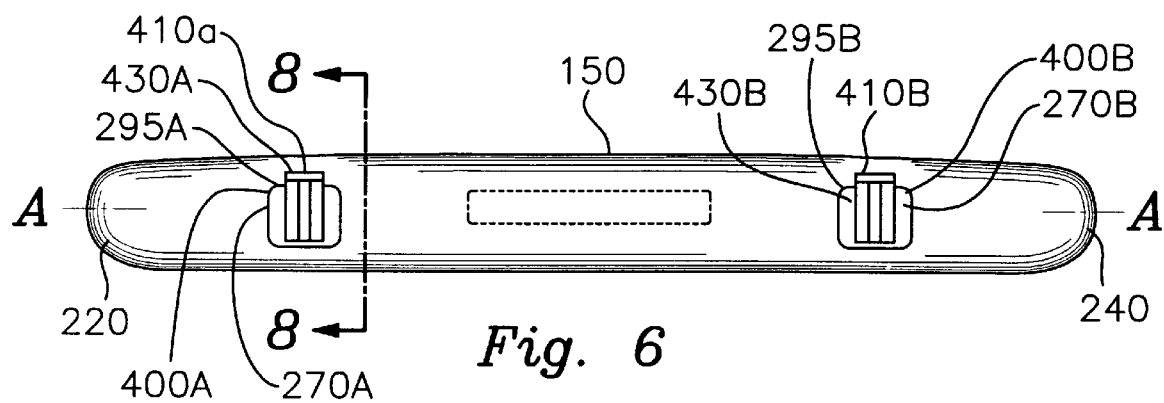
FIG. 6 is a rear elevational view of the back surface of the air deflector embodiment shown in FIG. 5.

As described above, the basic fastening means to affix the air deflector 150 to the motor vehicle is the adhesive means affixed to the plate member. In an additional embodiment of the subject invention, as seen in FIGS. 5, 6 and 7, the plate members 400A and 400B mounted to the lower face 280A and 280B of the protruding members 270A and 270B have a forward extension 410A and 410B that extends forward and beyond the forward edge 295A and 295B of each lower face member. More specifically, the plate members 400A and 400B in this embodiment are identical in configuration to the basic plate members 340A and 340B described before. The difference between plate attachment members 340A and 3406 is that attachment plates 400A and 400B have upper sections 405A and 405B and upper sections 410A and 410B longer than plate members 340A and 340B. Moreover, all along the frontal edge 420A and 420B of each plate member on such respective frontal ends 420A and 420B there is a curved hook portion 430A and 430B curved downwardly then inwardly to form such hook portions, with spacing inside. In this embodiment, the attachment plates 400A and 400B are fixed non-pivotal members as seen in FIGS. 5, 6, 7 and the hook portion of each plate member is adapted to be affixed over the top edge 160 of the door 130 in panel 120 to provide additional means to affix the air deflector 150 to motor vehicle 10.

In the preferred embodiment of the subject invention as shown in FIGS. 11, the attachment plates 400A and 400B, as described above and as seen, are adapted with hinge means to permit rotation of the attachment plates about the lower face 280A and 280B of each protruding member 270A and 270B. More specifically, the attachment plates 500A and 500B comprising the preferred embodiment as shown in FIGS. 8 and 11 are identical to plate members 400A and 400B as shown in the figure except that the back, upper surface 505A and 505B of each such attachment plate 500A and 500B is affixed through hinge members 520A and 520B appended directly or indirectly to the lower face 280A and 280B of the respective protruding members 270A and 270B as seen. This hinge arrangement permits the plate members 500A and 500B to rotate to some degree about such hinge members 520A and 520B, such rotational movement being about a hinge axis that is parallel to the planes of the respective lower faces 280A and 2806 of each protruding member 270A and 270B. In other words the plate members 500A and 500B can rotate a limited degree towards or away from the leading edge 200 of the air deflector in a plane of directional rotation perpendicular to such frontal edge, or perpendicular to the longitudinal central axis A—A of the air deflector 150.

It is seen in FIGS. 8 and 11 of the drawings that the preferred location of the hinge members 520A and 520B is at or near the lower forward, low edge 285A and 285B of each lower face 280A and 280B. This arrangment will then permit the attachment plate to rotate to a limited degree about such forward edges 285A and 285B.

In certain embodiments the hinge members 520A and 520B are affixed to an intermediate plate 540A and 540B attached flush to the lower face 280A and 280B on each protruding member 270A and 270B. Other positions may be used for the hinge members, 520A and 520B on the lower faces 280A and 280B, however the frontal edge 285A and 285B of the lower face 280A and 280B is the only practical location to permit free rotation of the plate members 500A and 500B. In this embodiment the forwardly placed hook portions 550A and 550B of attachment plate members 500A and 500B are identical to the hook portions on attachment plate members 400A and 400B as shown in FIGS. 8 and 11. These hooked portions 550A and 550B are adapted to be placed over the upper edge 160 of door member 130 in vehicle 10, just as in the situation with plate members 400A and 400B described above, for purposes of providing additional means to secure the air deflector to the vehicle 10.

Stated alternately and more particularly, in the latter described embodiment, the outer upper edges 530A and 530B of the attachment plate members 500A and 500B portion are curved outwardly away from the lower 280A and 280B face of the protruding member 270A and 270B and thence curved down in a hook-like manner in a substantially parallel position to the front face 570A and 570B of the plate member 500A and 500B thereby forming longitudinally extending hooked portions 550A and 550B all along the longitudinal upper edge 580A and 580B of such fastening plate member as graphically represented in FIG. 6, 8 and 11. In this particular embodiment, each hooked portion 550A and 550B is structured to hook around the upper edge of the rear door 130 affixed in the rear panel 120 of the vehicle as described above. The hooked portions 550A and 550B are placed over the upper edge of the rear door when opened with the adhesive coating of the plate members 500A and 500B facing towards the upper outer surface of the door 130 on panel 120 as to avoid any damage to the surface of the door. The door 130 is then closed with the hooked portion in place with the adhesive outer surface of the plate members 500A and 500B adhered to the adjacent outer surface of the vehicle 10.

Once the fastening plates 500A and 500B are hooked above the door edge and the door 130 is closed, each fastening plate pivots in a closing manner towards the lower faces 280A and 280B of the respective protruding members and the fastening plates, each with its adhesive surface will rest and set flush against the outer surface of the rear panel 120 as well as again the respective lower face of the protruding member. This mechanical action will in turn draw the air deflector 150 towards the vehicle surface for proper positioning. FIG. 8 shows schematically by the directional arrow how the fastening plates 500A and 500B will pivotal move downwardly towards the outer surface of the panel 120 to eventually adhere flush against a portion of the back panel 120 of vehicle 10.

Figure 10:
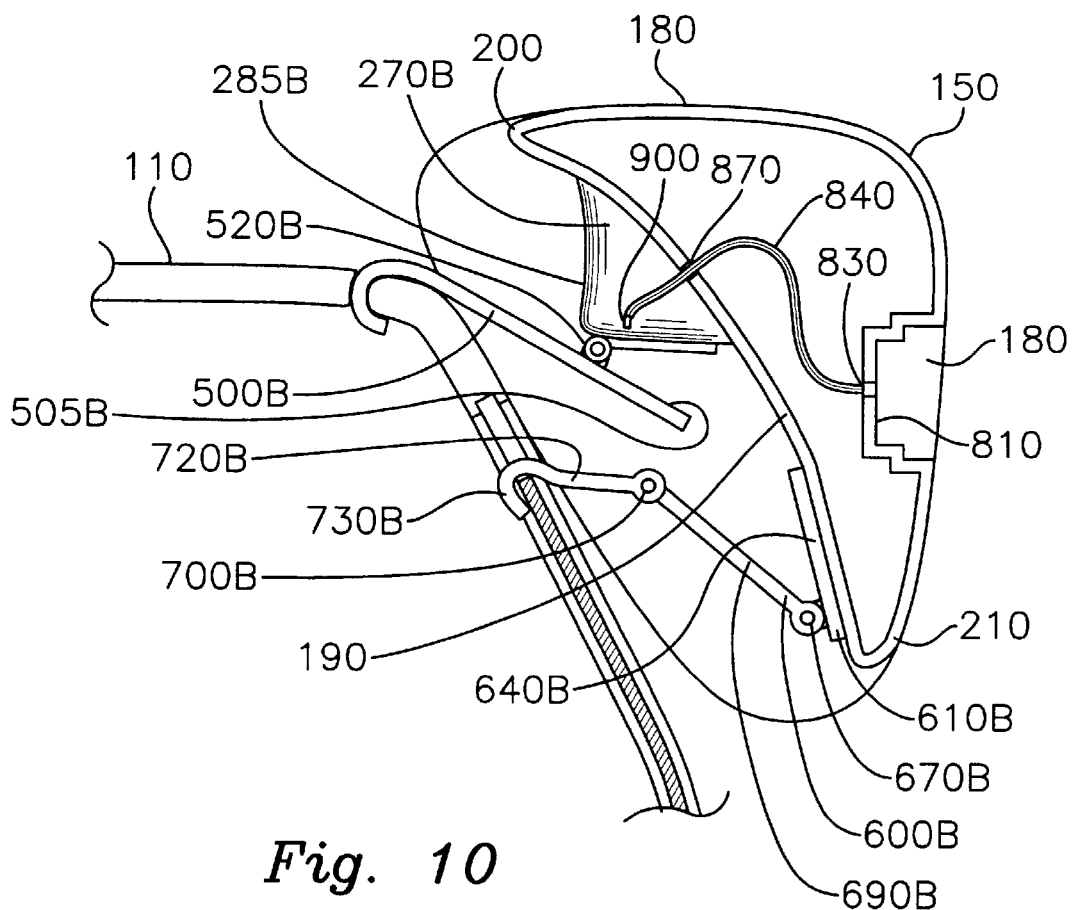
FIG. 10 is a side elevational view of the air deflect shown in FIG. 5, as attached to a motor vehicle.

Referring now to FIG. 10 of the drawing, in yet another embodiment of the subject invention, additional or secondary locking members 600A and 600B are affixed on the lower surface 190 of the air deflector 150, and preferably, positioned at the same level as the attachment plates 500A and 500B and spaced away a minimal distance from such attachment plates 500A and 500B, as seen in such drawing. More particularly, as seen, the secondary locking members 600A and 600B are positioned and other wise affixed on the lower surface of 190 of the air deflector 150 preferably at approximately the same level as the attachment plates 500A and 500B and between such attachment plates. However, these secondary locking members 600A and 600B may be positioned on other portions or areas of the lower surface of the air deflector 150. Additionally, only one or more than two of the said secondary locking members 600A and 600B may be used as secondary locking members. In the preferred embodiment, each of the secondary locking members 600A and 600B is positioned at approximately the same level as attachment plates 500A and 500B on the lower surface.

More specifically, each of the secondary locking members 600A and 600B are double acting, that is with double pivot points. As seen in FIG. 8, each secondary locking member has a secondary base plate 610A and 610B affixed to the lower surface 190 of the air deflector 150, each such secondary base plate member having an outer face 640A and 640B. As seen, each secondary base plate member 610A and 610B has a hinge 670A and 670B preferably on the lower end of the outer face 640A and 640B, which hinge is aligned parallel to the lower surface 190 of the air deflector and parallel to the longitudinal central axis A—A of the air deflector 150. As seen from the drawings, each hinge member 670A and 670B is connected to a first pivotable arm member 690A and 690B on each said locking member 600A and 600B, and which first arm member is pivotable outwardly from the outer face 640A and 640B of the secondary base plate member 610A and 610B, as seen.

The upper portion of each of the first pivotable arm members 690A and 690B is affixed to a second hinge member 700A and 700B, which is in turn, pivotably mounted to a second pivotable arm member 720A and 720B. Each second pivotable arm member 720A and 720B has a hooked portion 730A and 730B in the upper outer part thereof which is adapted to engage against the upper edge of the rear retractable window 165 in door 130 in the back panel 120 of the vehicle 10. This provides additional locking means for air deflector 150 and with such double acting pivotable features provides flexible adaptation of the air deflector when installing, or removing, and further flexibility when the rear door is opened or closed, or the rear window raised or lowered

What is claimed is:

1. An air deflector to be affixed proximate to a roof of a motor vehicle and in part to a rear door on said vehicle comprising:
   (a) a longitudinally extending member having a front end and a posterior end, and having a upper posterior upper surface and a frontal, lower surface said longitudinally extending member having one or more protruding members affixed to said lower surface.
   (b) attachment means to affix to each of said protruding members said attachment means comprising hinged plate members having a hooked portion thereof said hooked portion being adapted to attach to a portion of the motor vehicle.

2. An air deflector to be affixed over part of a roof of a motor vehicle and in part to a rear panel on said vehicle comprising:
   (a) a longitudinally extending member having a front end and a posterior end and having a upper posterior upper surface and a frontal, lower surface said longitudinally extending member having one or more protruding members affixed to said lower surface;
   (b) attachment means to affix to each of said protruding members said attachment means comprising hinged plate members having a hooked portion thereof said hooked portion being adapted to attach to a position of the motor vehicle;

(c) Secondary attachment means affixed to the lower surface of said longitudinally extending member, said secondary attachment means having a hook means to attach to a portion of said panel.

3. An air deflector to be affixed partially over a roof of a motor vehicle roof and said vehicle comprising:
  (a) a longitudinally extending member having a front end and a posterior end and having a upper posterior upper surface and a frontal, lower surface said longitudinally extending member having one or more protruding members affixed to said lower surface;
  (b) attachment means to affix to each of said protruding members said attachment means comprising hinged plate members having a hooked thereof said hooked portion being adaped to attach to a portion of said vehicle;
  (c) secondary attachment means affixed to the lower surface of said longitudinally extending member, said secondary attachment means having a hook means to attach to a portion of said vehicle
  (d) electrical wire holding means for holding electrical wire on said air deflector, said wire holding means having a conduit means in the lower surface of said longitudinally extending member.

* * * * *